United States Patent
Dhurandhar et al.

(10) Patent No.: US 12,514,901 B2
(45) Date of Patent: Jan. 6, 2026

(54) AD36E4ORF1: A THERAPEUTIC TREATMENT FOR ALZHEIMER'S DISEASE

(71) Applicant: Texas Tech University System, Lubbock, TX (US)

(72) Inventors: Nikhil V. Dhurandhar, Lubbock, TX (US); Vijay Hegde, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 844 days.

(21) Appl. No.: 17/633,332

(22) PCT Filed: Aug. 7, 2020

(86) PCT No.: PCT/US2020/045485
§ 371 (c)(1),
(2) Date: Feb. 7, 2022

(87) PCT Pub. No.: WO2021/026495
PCT Pub. Date: Feb. 11, 2021

(65) Prior Publication Data
US 2022/0288159 A1    Sep. 15, 2022

Related U.S. Application Data

(60) Provisional application No. 62/884,150, filed on Aug. 7, 2019.

(51) Int. Cl.
*A61P 25/28* (2006.01)
*A61K 38/16* (2006.01)

(52) U.S. Cl.
CPC ............ *A61K 38/162* (2013.01); *A61P 25/28* (2018.01); *C12N 2710/10371* (2013.01)

(58) Field of Classification Search
CPC .............. A61P 25/28; A61P 25/14; C12N 2710/10371; C12N 2710/10322; C12N 15/90; A61K 48/005; C07K 14/005; A01K 2217/054; A01K 2267/0312; A01K 2217/052; A01K 2217/15; A01K 67/0275
See application file for complete search history.

(56) References Cited

U.S. PATENT DOCUMENTS

| | | | |
|---|---|---|---|
| 8,008,436 B2 | 8/2011 | Dhurandhar et al. | |
| 9,346,835 B2 | 5/2016 | Dhurandhar et al. | |
| 9,469,659 B2 | 10/2016 | Dhurandhar et al. | |
| 9,714,259 B2 | 7/2017 | Dhurandhar et al. | |
| 10,047,107 B2 | 8/2018 | Das et al. | |
| 2009/0264356 A1* | 10/2009 | Dhurandhar | C07K 14/005 514/6.9 |
| 2017/0137781 A1* | 5/2017 | Qiang | C12N 5/0622 |
| 2017/0336395 A1* | 11/2017 | Davidson | A61K 48/0083 |

FOREIGN PATENT DOCUMENTS

WO    WO 2007064836    6/2007

OTHER PUBLICATIONS

Ortega, From Lab Bench to Hope Emerging Gene Therapies in Clinical Trials for Alzheimer's Disease. Molecular Neurobiology 62: 1112-1135 (Year: 2025).*
Friedlander, Allele-selective inhibition of mutant htt transcription throughout the brain after subcutaneous. Journal of Neurology, Neurosurgery & Psychiatry;93:A86-A87. (Year: 2022).*
Simonato, Progress in gene therapy for neurological disorders. Nat Rev Neurol. May ; 9(5): 277-291. (Year: 2013).*
International Search Report and Written Opinion for PCT/US20/45485, Mailed on Dec. 14, 2020.

* cited by examiner

*Primary Examiner* — Neil P Hammell
*Assistant Examiner* — Julio Washington Gomez Rodriguez
(74) *Attorney, Agent, or Firm* — Shackelford, McKinley & Norton, LLP

(57) ABSTRACT

Embodiments of the present disclosure pertain to methods of treating or preventing Alzheimer's disease or symptoms of Alzheimer's disease in a subject by administering to the subject an active agent that includes an adenovirus-36 E4orf1 protein, a nucleic acid encoding an adenovirus-36 E4orf1 protein, or combinations thereof. Additional embodiments of the present disclosure pertain to the active agents of the present disclosure for use in the treatment or prevention of Alzheimer's disease or symptoms of Alzheimer's disease.

16 Claims, 9 Drawing Sheets
Specification includes a Sequence Listing.

SEQUENCE LISTING

```
<160> NUMBER OF SEQ ID NOS: 4

<210> SEQ ID NO 1
<211> LENGTH: 378
<212> TYPE: DNA
<213> ORGANISM: Artificial Sequence
<220> FEATURE:
```

<223> OTHER INFORMATION: Ad-36 E4 orf 1 DNA Sequence

<400> SEQUENCE: 1

```
atggctgaat ctctgtatgc tttcatagat agccctggag ggatcgctcc cgtccaggaa      60
ggggctagca atagatatat cttcttttgc cccgaatctt tccacattcc tccgcatggg     120
gtgatattgc ttcacctcag agtgagcgtg ctggttccta ctggatatca gggcagattt     180
atggccttga tgactacca tgccaggggc atactaaccc agtccgatgt gatatttgcc      240
gggagaagac atgatctctc tgtgctgctc tttaaccaca cggaccgatt tttgtatgtc     300
cgcgagggcc acccagtggg aaccctgctg ctggagagag tgattttttcc ttcagtgaga    360
atagccaccc tggtttag                                                   378
```

<210> SEQ ID NO 2
<211> LENGTH: 125
<212> TYPE: PRT
<213> ORGANISM: Artificial Sequence
<220> FEATURE:
<223> OTHER INFORMATION: Ad-36 E4 orf 1 Protein Translation

<400> SEQUENCE: 2

```
Met Ala Glu Ser Leu Tyr Ala Phe Ile Asp Ser Pro Gly Gly Ile Ala
1               5                   10                  15

Pro Val Gln Glu Gly Ala Ser Asn Arg Tyr Ile Phe Phe Cys Pro Glu
            20                  25                  30

Ser Phe His Ile Pro Pro His Gly Val Ile Leu Leu His Leu Arg Val
        35                  40                  45

Ser Val Leu Val Pro Thr Gly Tyr Gln Gly Arg Phe Met Ala Leu Asn
    50                  55                  60

Asp Tyr His Ala Arg Gly Ile Leu Thr Gln Ser Asp Val Ile Phe Ala
65                  70                  75                  80

Gly Arg Arg His Asp Leu Ser Val Leu Leu Phe Asn His Thr Asp Arg
                85                  90                  95

Phe Leu Tyr Val Arg Glu Gly His Pro Val Gly Thr Leu Leu Leu Glu
            100                 105                 110

Arg Val Ile Phe Pro Ser Val Arg Ile Ala Thr Leu Val
        115                 120                 125
```

<210> SEQ ID NO 3
<211> LENGTH: 366
<212> TYPE: DNA
<213> ORGANISM: Artificial Sequence
<220> FEATURE:
<223> OTHER INFORMATION: Ad-36 E4 orf 1 (delta)PDZ DNA Sequence

<400> SEQUENCE: 3

```
atggctgaat ctctgtatgc tttcatagat agccctggag ggatcgctcc cgtccaggaa      60
ggggctagca atagatatat cttcttttgc cccgaatctt tccacattcc tccgcatggg     120
gtgatattgc ttcacctcag agtgagcgtg ctggttccta ctggatatca gggcagattt     180
atggccttga tgactacca tgccaggggc atactaaccc agtccgatgt gatatttgcc      240
gggagaagac atgatctctc tgtgctgctc tttaaccaca cggaccgatt tttgtatgtc     300
cgcgagggcc acccagtggg aaccctgctg ctggagagag tgattttttcc ttcagtgaga    360
atatag                                                                366
```

<210> SEQ ID NO 4
<211> LENGTH: 121

-continued

```
<212> TYPE: PRT
<213> ORGANISM: Artificial Sequence
<220> FEATURE:
<223> OTHER INFORMATION: Ad-36 E4 orf 1 (delta)PDZ Protein Translation

<400> SEQUENCE: 4

Met Ala Glu Ser Leu Tyr Ala Phe Ile Asp Ser Pro Gly Gly Ile Ala
1               5                   10                  15

Pro Val Gln Glu Gly Ala Ser Asn Arg Tyr Ile Phe Phe Cys Pro Glu
                20                  25                  30

Ser Phe His Ile Pro Pro His Gly Val Ile Leu Leu His Leu Arg Val
            35                  40                  45

Ser Val Leu Val Pro Thr Gly Tyr Gln Gly Arg Phe Met Ala Leu Asn
        50                  55                  60

Asp Tyr His Ala Arg Gly Ile Leu Thr Gln Ser Asp Val Ile Phe Ala
65                  70                  75                  80

Gly Arg Arg His Asp Leu Ser Val Leu Leu Phe Asn His Thr Asp Arg
                85                  90                  95

Phe Leu Tyr Val Arg Glu Gly His Pro Val Gly Thr Leu Leu Leu Glu
            100                 105                 110

Arg Val Ile Phe Pro Ser Val Arg Ile
            115                 120
```

AD36E4ORF1: A THERAPEUTIC TREATMENT FOR ALZHEIMER'S DISEASE

CROSS-REFERENCE TO RELATED APPLICATIONS

This application claims priority to U.S. Provisional Patent Application No. 62/884,150, filed on Aug. 7, 2019. The entirety of the aforementioned application is incorporated herein by reference.

BACKGROUND

Current methods and compositions for treating Alzheimer's disease have numerous limitations, including limited efficacy. As such, a need exists for more effective therapeutics and methods for treating Alzheimer's disease. Embodiments of the present disclosure address the aforementioned need.

SUMMARY

In some embodiments, the present disclosure pertains to methods of treating or preventing Alzheimer's disease or symptoms of Alzheimer's disease in a subject by administering to the subject an active agent that includes an adenovirus-36 E4orf1 protein, a nucleic acid encoding an adenovirus-36 E4orf1 protein, or combinations thereof. Additional embodiments of the present disclosure pertain to the active agents of the present disclosure for use in the treatment or prevention of Alzheimer's disease or symptoms of Alzheimer's disease.

In some embodiments, the active agent includes an adenovirus-36 E4orf1 protein. In some embodiments, the adenovirus-36 E4orf1 protein includes SEQ ID NO: 2, SEQ ID NO:4, or a functional variant thereof.

In some embodiments, the active agent includes a nucleic acid encoding adenovirus-36 E4orf1. In some embodiments, the nucleic acid includes SEQ ID NO:1, SEQ ID NO:3, or a functional variant thereof.

In some embodiments, the active agents of the present disclosure are administered in therapeutically effective amounts to various subjects. In some embodiments, the subject is a human being. In some embodiments, the subject is a non-human animal. In some embodiments, the subject is suffering from Alzheimer's disease. In some embodiments, the subject is vulnerable to Alzheimer's disease. In some embodiments, the subject exhibits symptoms of Alzheimer's disease. In some embodiments, the symptoms of Alzheimer's disease include, without limitation, dementia, impaired cognition, impaired memory, or combinations thereof.

In some embodiments, the methods and active agents of the present disclosure are utilized to prevent Alzheimer's disease or symptoms of Alzheimer's disease. In some embodiments, the methods and active agents of the present disclosure are utilized to treat Alzheimer's disease or symptoms of Alzheimer's disease. In some embodiments, the methods and active agents of the present disclosure treat or prevent Alzheimer's disease or symptoms of Alzheimer's disease by reducing the number of beta amyloid plaques in a subject's brain, preserving normal neuronal morphology, improving or maintaining the subject's cognition, or preventing cognition decline in the subject.

DESCRIPTION OF THE DRAWINGS

FIG. 2 provides various data related to E4orf1's effects on glycemic control.

FIG. 3 provides additional data related to E4orf1's effects on glycemic control.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Alzheimer's disease (AD) is an age dependent progressive neurodegenerative disease in which β-amyloid plaques and hyperphosphorylated tau accumulate in the brain with associated cognitive decline, dementia and eventual death. AD cases are increasing with an estimated global prevalence of about 80 million predicted by 2040.

Type 2 diabetes (T2D) is a chronic disease characterized by progressive insulin resistance (IR) and hyperglycemia with major complications, including kidney disease, heart disease, retinopathy, neuropathy and cerebrovascular disease (CVD). Prevalence of T2D in 2013 was 410 million, a 133% increase over 13 years, the largest increase for any health condition.

Though aging is the strongest predictor of AD, T2D is a risk factor for developing all cause dementia and dementia attributable to AD, demonstrated in several prospective longitudinal cohort studies. This suggests that the correction of blood sugar dysregulation may represent a crucial step in the prevention or treatment of AD.

Numerous clinical, animal model, and postmortem studies have suggested that treatment of persons suffering from dementia with anti-diabetic medications may have beneficial effects on cognitive function and on AD-related neuropathology. However, in contrast, certain anti-diabetic drugs like Metformin contribute to the comorbidity between AD and T2D.

Despite initial promising outcomes, even the insulin sensitizing drug, rosiglitazone, showed no effect on cognitive function in three large clinical studies. Therefore, better treatment options are needed for Alzheimer's disease. The present disclosure addresses the aforementioned need.

Figure 1:
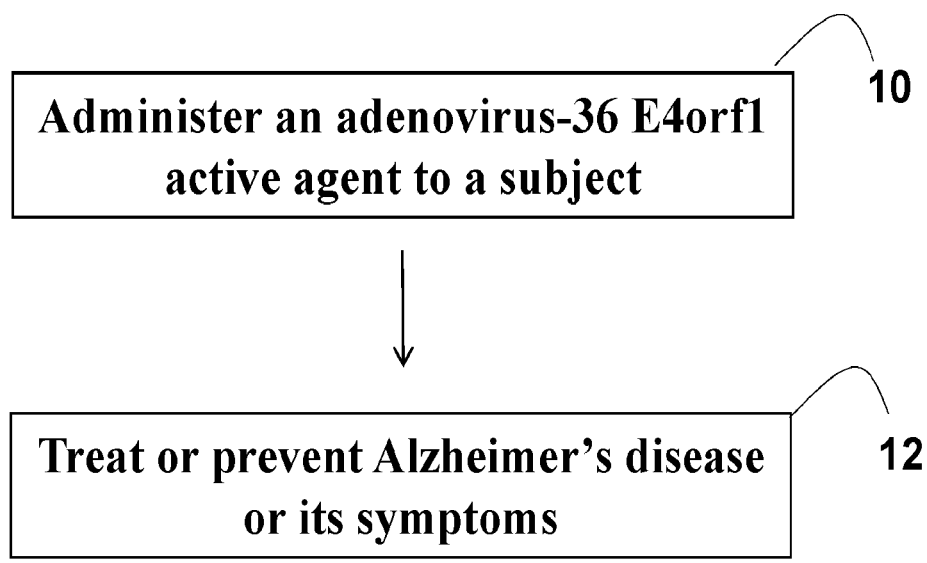
FIG. 1 illustrates a method of treating or preventing Alzheimer's disease or symptoms of Alzheimer's disease in a subject by administering an adenovirus-36 E4orf1 active agent to the subject.

In some embodiments, the present disclosure pertains to methods of treating or preventing Alzheimer's disease or symptoms of Alzheimer's disease in a subject. In some embodiments illustrated in FIG. 1, the methods of the present disclosure include a step of administering to the subject an active agent that includes an adenovirus-36 E4orf1 protein, a nucleic acid encoding an adenovirus-36 E4orf1 protein, or combinations thereof (step 10). In some embodiments, the administration of the active agent to the subject results in the treatment or prevention of Alzheimer's disease or symptoms of Alzheimer's disease. Additional embodiments of the present disclosure pertain to the active agents of the present disclosure for use in the treatment or prevention of Alzheimer's disease or symptoms of Alzheimer's disease.

As set forth in more detail herein, the methods and active agents of the present disclosure can have numerous embodiments. In particular, various methods may be utilized to administer various active agents to various subjects for the treatment or prevention of Alzheimer's disease or symptoms of Alzheimer's disease.

Active Agents

The present disclosure can utilize various active agents. For instance, in some embodiments, the active agents include, without limitation, an adenovirus-36 E4orf1 protein, a nucleic acid encoding an adenovirus-36 E4orf1 protein, or combinations thereof.

In some embodiments, the active agent includes an adenovirus-36 E4orf1 protein. In some embodiments, the adenovirus-36 E4orf1 protein is in isolated form. In some embodiments, the adenovirus-36 E4orf1 protein is in recombinant form.

As used herein "adenovirus-36 E4orf1" refers to naturally occurring or endogenous E4orf1 proteins from adenovirus 36, to proteins having an amino acid sequence which is the same as that of a naturally occurring or endogenous corresponding adenovirus-36 E4orf1 protein (e.g., recombinant proteins), and to functional variants of each of the foregoing (e.g., functional fragments and/or mutants produced via mutagenesis and/or recombinant techniques). Accordingly, as defined herein, the term includes mature adenovirus-36 E4orf1, glycosylated or unglycosylated adenovirus-36 E4orf1 proteins, polymorphic or allelic variants, and other isoforms of adenovirus-36 E4orf1 proteins (e.g., produced by alternative splicing or other cellular processes), and functional fragments.

In some embodiments, the adenovirus-36 E4orf1 protein includes SEQ ID NO: 2, SEQ ID NO:4, or a functional variant thereof. In some embodiments, the functional variant has at least 85% sequence identity to SEQ ID NO:2 or SEQ ID NO:4. In some embodiments, the functional variant has at least 90% sequence identity to SEQ ID NO:2 or SEQ ID NO:4. In some embodiments, the functional variant has at least 95% sequence identity to SEQ ID NO:2 or SEQ ID NO:4. In some embodiments, the functional variant has at least 99% sequence identity to SEQ ID NO:2 or SEQ ID NO:4.

In some embodiments, the adenovirus-36 E4orf1 protein includes SEQ ID NO: 2. In some embodiments, the adenovirus-36 E4orf1 protein includes SEQ ID NO:4. In some embodiments, the adenovirus-36 E4orf1 protein includes a functional variant of SEQ ID NO: 2. In some embodiments, the adenovirus-36 E4orf1 protein includes a functional variant of SEQ ID NO:4.

In some embodiments, functional variants of adenovirus-36 E4orf1 protein include functional fragments, functional mutant proteins, and/or functional fusion proteins. Generally, fragments or portions of adenovirus-36 E4orf1 encompassed by the present disclosure include those having a deletion (i.e., one or more deletions) of an amino acid (i.e., one or more amino acids) relative to the mature adenovirus-36 E4orf1 (such as N-terminal, C-terminal or internal deletions). Fragments or portions in which only contiguous amino acids have been deleted or in which non-contiguous amino acids have been deleted relative to mature adenovirus-36 E4orf1 are also envisioned.

In some embodiments, the active agent includes a nucleic acid encoding adenovirus-36 E4orf1. In some embodiments, the nucleic acid includes an isolated or recombinant nucleic acid or vector encoding adenovirus-36 E4orf1 or a functional variant thereof. In some embodiments, the nucleic acid is in the form of DNA, RNA, or combinations thereof. In some embodiments, the nucleic acid can be either single or double stranded.

In some embodiments, the nucleic acid includes SEQ ID NO:1, SEQ ID NO:3, or a functional variant thereof. In some embodiments, the functional variant has at least 85% sequence identity to SEQ ID NO:1 or SEQ ID NO:3. In some embodiments, the functional variant has at least 90% sequence identity to SEQ ID NO:1 or SEQ ID NO:3. In some embodiments, the functional variant has at least 95% sequence identity to SEQ ID NO:1 or SEQ ID NO:3. In some embodiments, the functional variant has at least 99% sequence identity to SEQ ID NO:1 or SEQ ID NO:3.

In some embodiments, the nucleic acid includes SEQ ID NO:1. In some embodiments, the nucleic acid includes SEQ ID NO:3. In some embodiments, the nucleic acid includes a functional variant of SEQ ID NO:1. In some embodiments, the nucleic acid includes a functional variant of SEQ ID NO:3.

In some embodiments, the active agents of the present disclosure are in a composition. In some embodiments, the compositions of the present disclosure help make the active agents of the present disclosure suitable for administration.

In some embodiments, the compositions of the present disclosure also include one or stabilizers. In some embodiments, the stabilizers include, without limitation, anti-oxidants, sequestrants, ultraviolet stabilizers, or combinations thereof.

In some embodiments, the compositions of the present disclosure also include one or more surfactants. In some embodiments, the surfactants include, without limitation, anionic surfactants, sugars, cationic surfactants, zwitterionic surfactants, non-ionic surfactants, or combinations thereof.

In some embodiments, the compositions of the present disclosure also include one or more excipients. In some embodiments, the excipients include, without limitation, lactose, sucrose, starch powder, cellulose esters of alkanoic acids, trehalose, cellulose alkyl esters, talc, stearic acid, magnesium stearate, magnesium oxide, sodium and calcium salts of phosphoric and sulfuric acids, gelatin, acacia gum, trehalose, sodium alginate, polyvinylpyrrolidone, polyvinyl alcohol, or combinations thereof.

In some embodiments, the compositions of the present disclosure include a delivery vehicle, such as a particle. In some embodiments, the particle includes, without limitation, lipid-based particles, carbon-based particles, metal-based particles, or combinations thereof. In some embodiments, the active agents of the present disclosure are encapsulated in the particle.

Administration of Active Agents to Subjects

In some embodiments, the active agents of the present disclosure are administered to a subject in therapeutically effective amounts. Various methods may be utilized to administer the active agents of the present disclosure to a subject. For instance, in some embodiments, the administration occurs by methods that include, without limitation, intravenous administration, subcutaneous administration, transdermal administration, topical administration, intraarterial administration, intrathecal administration, intracranial administration, intraperitoneal administration, intraspinal administration, intranasal administration, intraocular administration, oral administration, intratumor administration, and combinations thereof.

In some embodiments where the active agent is a nucleic acid encoding an adenovirus-36 E4orf1 protein, the nucleic acid is administered to the subject in a manner permitting expression of the adenovirus-36 E4orf1 protein. In some embodiments, the nucleic acid is introduced by a method that includes, without limitation, electroporation, DEAE Dextran transfection, calcium phosphate transfection, cationic liposome fusion, proptoplast fusion, creation of an in vivo electric field, DNA-coated microprojectile bombardment, injection with recombinant replication-defective viruses, homologous recombination, in vivo gene therapy, ex vivo gene therapy, viral vectors, and naked DNA transfer.

Subjects

The active agents of the present disclosure may be administered to various subjects. For instance, in some embodiments, the subject is a human being. In some embodiments, the subject is a non-human animal. In some embodiments, the non-human animal includes, without limitation, a cat, a dog, or a horse.

In some embodiments, the subject is suffering from Alzheimer's disease. In some embodiments, the subject is vulnerable to Alzheimer's disease. In some embodiments, the subject exhibits symptoms of Alzheimer's disease. In some embodiments, the symptoms of Alzheimer's disease include, without limitation, dementia, impaired cognition, impaired memory, or combinations thereof.

Effects

The methods and active agents of the present disclosure can have various effects on a subject. For instance, in some embodiments, the methods and active agents of the present disclosure are utilized to prevent Alzheimer's disease or symptoms of Alzheimer's disease. In some embodiments, the methods and active agents of the present disclosure are utilized to prevent Alzheimer's disease. In some embodiments, the methods and active agents of the present disclosure are utilized to prevent symptoms of Alzheimer's disease.

In some embodiments, the methods and active agents of the present disclosure are utilized to treat Alzheimer's disease or symptoms of Alzheimer's disease. In some embodiments, the methods and active agents of the present disclosure are utilized to treat Alzheimer's disease. In some embodiments, the methods and active agents of the present disclosure are utilized to treat symptoms of Alzheimer's disease.

In some embodiments, the methods and active agents of the present disclosure treat or prevent Alzheimer's disease or symptoms of Alzheimer's disease by reducing the number of beta amyloid plaques in a subject's brain. In some embodiments, the methods and active agents of the present disclosure treat or prevent Alzheimer's disease or symptoms of Alzheimer's disease by preserving normal neuronal morphology.

In some embodiments, the methods and active agents of the present disclosure treat or prevent Alzheimer's disease or symptoms of Alzheimer's disease by improving or maintaining the subject's cognition. In some embodiments, cognition is defined by factors that include, without limitation, learning ability, spatial learning, retention of memory, cognition decline, or combinations thereof. In some embodiments, the methods and active agents of the present disclosure treat or prevent Alzheimer's disease or symptoms of Alzheimer's disease by preventing cognition decline in the subject.

Without being bound by theory, the methods and active agents of the present disclosure may act through various molecular mechanisms in order to treat or prevent Alzheimer's disease or symptoms of Alzheimer's disease. For instance, in some embodiments, the administration of the active agents of the present disclosure result in long-term improvement in glycemic control and reduction in hyperinsulinemia. Such effects in turn facilitate the treatment or prevention of Alzheimer's disease or symptoms of Alzheimer's disease.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Ad36E4orf1: A possible therapeutic treatment for Alzheimer's Disease

In this Example, Applicant investigated the role of improved systemic glycemic control and its effect on ameliorating cognitive decline in a mouse model of Alzheimer's disease (AD). Applicant conducted a pilot study with transgenic APP mice (Tg2576) infected with human adenovirus 36 (Ad36).

Natural Ad36 infection in humans and experimental Ad36 infection of animals (chickens, rats, mice, non-human primates) is correlatively and causatively linked with obesity. Further studies showed that Ad36 infection improves glycemic control and attenuates hepatic steatosis in rodents, despite a 60% fat diet.

Applicant's observations show that, in APP transgenic mice susceptible to impaired glucose control and AD, Ad36 infection improves glycemic control over time and prevents cognitive decline by reducing the accumulation of soluble amyloid beta (A(β)) and preserving normal neuronal morphology.

Use of virus Ad36 is not a practical option in humans. Therefore, Applicant generated a "triple" transgenic mouse model (APP/PS1/E4orf1), by crossing the transgenic APP/PS1 mouse model of AD with transgenic Ad36E4orf1 mouse expressing E4orf1. Applicant validated the presence of all three transgenes in this mouse model by DNA genotyping.

The ability of E4orf1 expression to improve systemic glycemic control by "sparing" endogenous insulin secretion was also determined. Two-month old APP/PS1/E4orf1 and APP/PS1 control mice on doxycycline supplemented with rodent chow diet for 4 weeks to induce E4orf1 expression were given an oral bolus of glucose (2.5 g/kg) and glucose. Glucose clearance was measured via GTT.

Figure 2A:
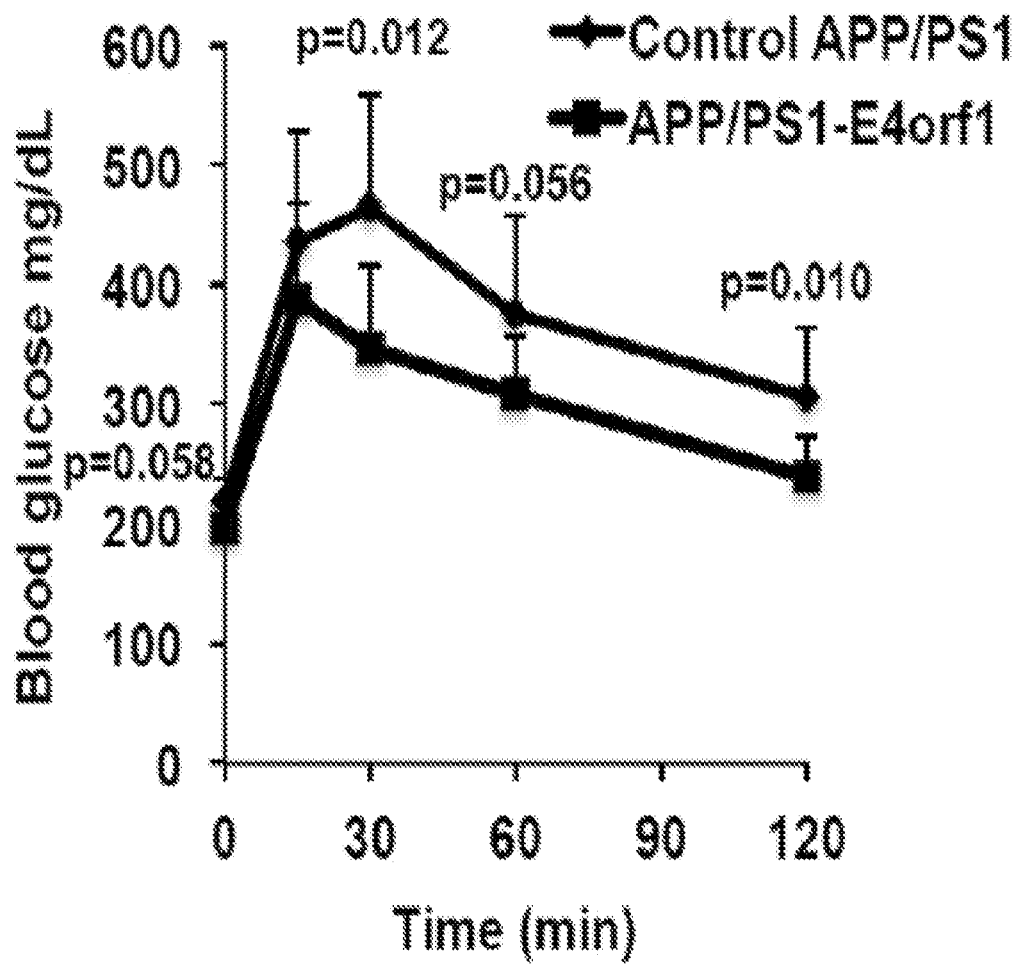
FIG. 2A shows that E4orf1 expression improves glycemic control in APP/PS1 mice.
Figure 2B:
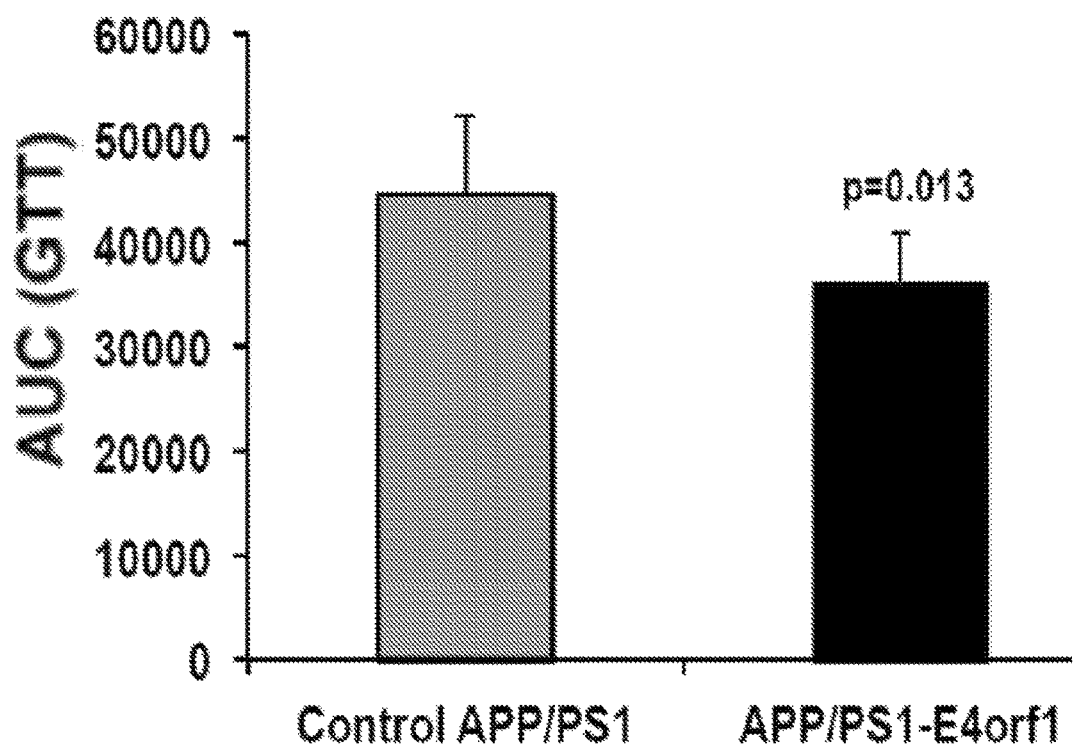
FIGS. 2B, 2C and 2D show with lower areas under the curve (AUC) that E4orf1 expression improves glycemic control in APP/PS1 mice (FIG. 2B) without increasing endogenous insulin secretion (FIGS. 2C and 2D).
Figure 2C:
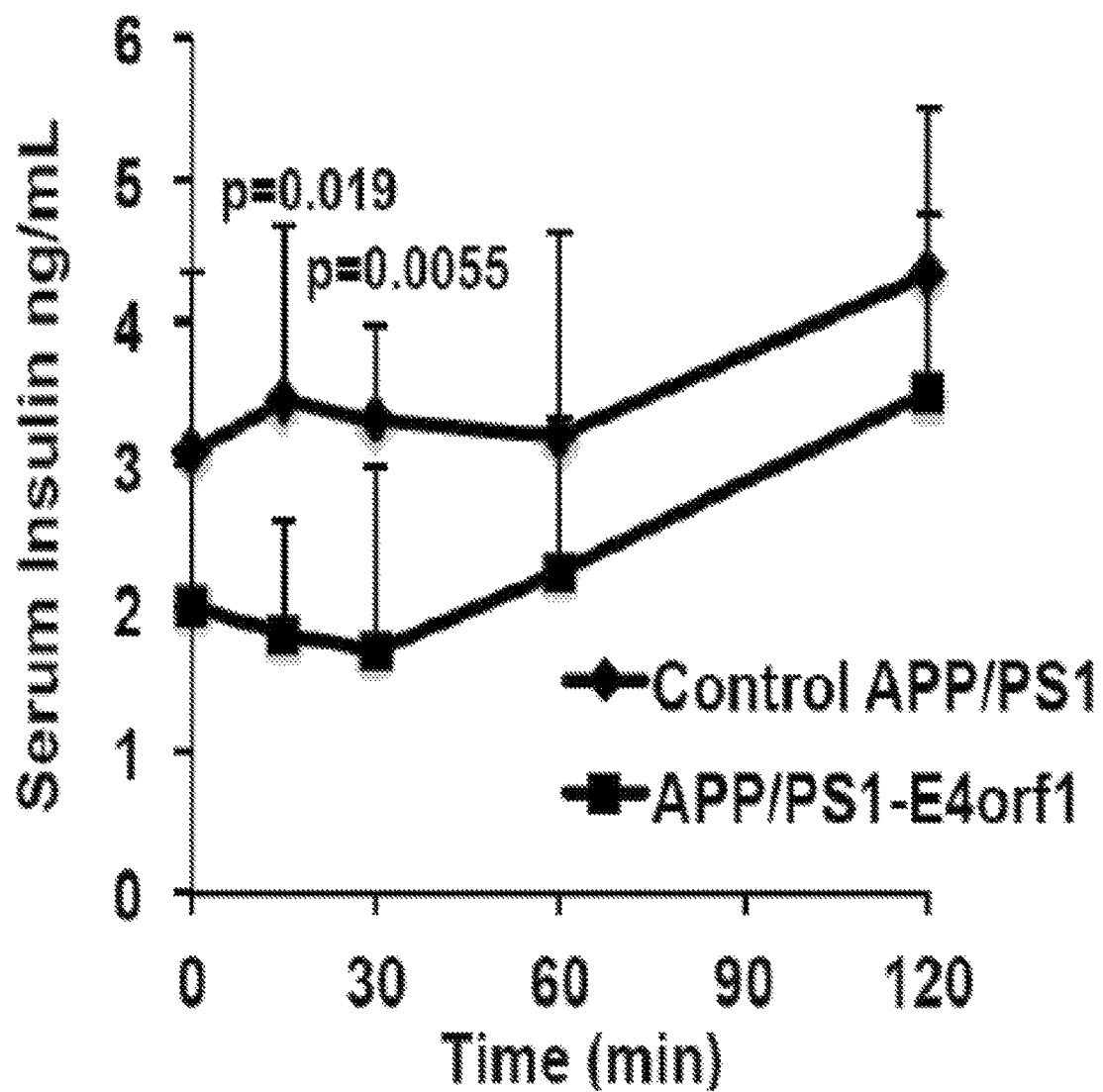
Figure 2D:
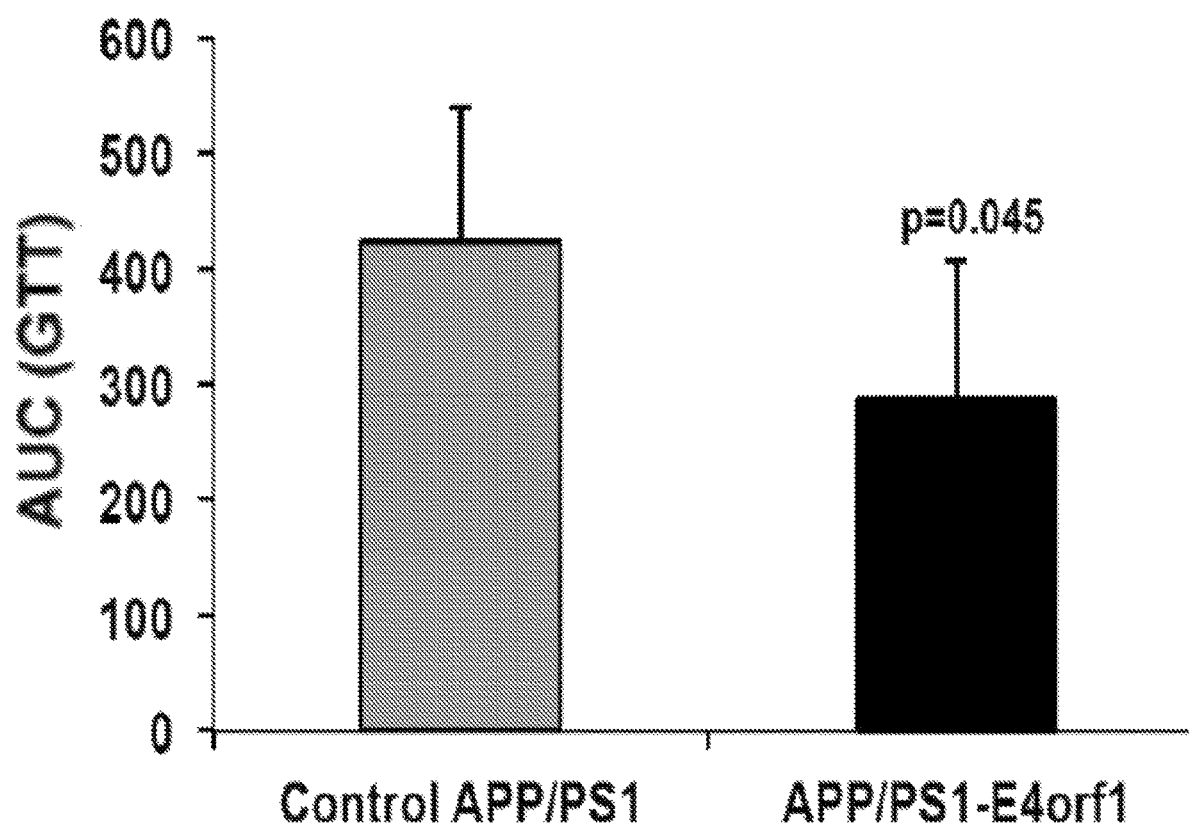

As shown in FIG. 2, APP/PS1 mice expressing E4orf1 were able to clear blood glucose significantly faster (FIGS. 2A-B), requiring significantly lower endogenous insulin to clear the bolus of glucose compared with control APP/PS1 mice (FIGS. 2C-D). Following a 4 hour fast, the fasting glucose levels at time 0 is also significantly higher in the control APP mice, indicating possible hyperinsulinemia. This proof of concept experiment confirms and validates the ability of Ad36 E4orf1 in modulating peripheral glycemic control in an insulin-sparing manner in a mouse model of AD.

Cognitive deficits are observed in older people with glucose intolerance or untreated diabetes. However, these deficits appear to be attenuated by treatments that improve glycemic control. Many clinical and epidemiological studies indicate that AD patients often exhibit glucose and/or insulin dysregulation, and that diabetes is the second greatest risk factor for AD.

Further, diabetic patients can exhibit cognitive decline as well as amyloidosis and tau pathology in their pancreas. Thus, a pre-diabetic impairment in peripheral glucose/insulin regulation has been suggested to contribute to AD associated cognitive decline and pathogenesis. Diabetic and non-diabetic subjects with insulin resistance have been shown to experience accelerated cognitive decline in executive function and memory.

In animal models of AD, thiazolidinediones (TZDs) have been shown to ameliorate disease related pathology and to improve learning and memory deficits. Based on these observations, the efficacy of various TZDs (mainly rosiglitazone) in improving cognitive deficits in individuals with AD has been tested in clinical trials, albeit with inconsistent findings.

One of the reasons for these inconsistent results could be that studies in mice are done over time during the aging process while in humans, therapeutic intervention is provided after an individual is clinically diagnosed with mild cognitive impairment or AD. As Applicant has shown that Ad36E4orf1 is able to improve glycemic control in a mouse model of AD (FIG. 2), Applicant aimed to test the ability of Ad36E4orf1 in improving glycemic control and prevent cognition decline in aged (18-24 month old) APP/PS1 mice.

The APP/PS1 male mice compared to wild-type controls have impaired glucose tolerance, with hyperinsulinemia and a trend for insulin resistance, prior to the detection of Aβ plaque pathology, learning/memory decline, and other behavioral alterations.

Fourteen to twenty-month old APP/PS1/E4orf1 (n=11) and APP/PS1 (n=7) control male and female mice were exposed to a 60% high fat diet (HFD) supplemented with doxycycline to induce Ad36E4orf1 expression. Following 10-weeks of HFD, the mice were switched to a doxycycline supplemented rodent chow diet for an additional 10-weeks. While on chow diet, the mice were given an oral bolus of glucose (2.0 g/kg).

Figure 3A:
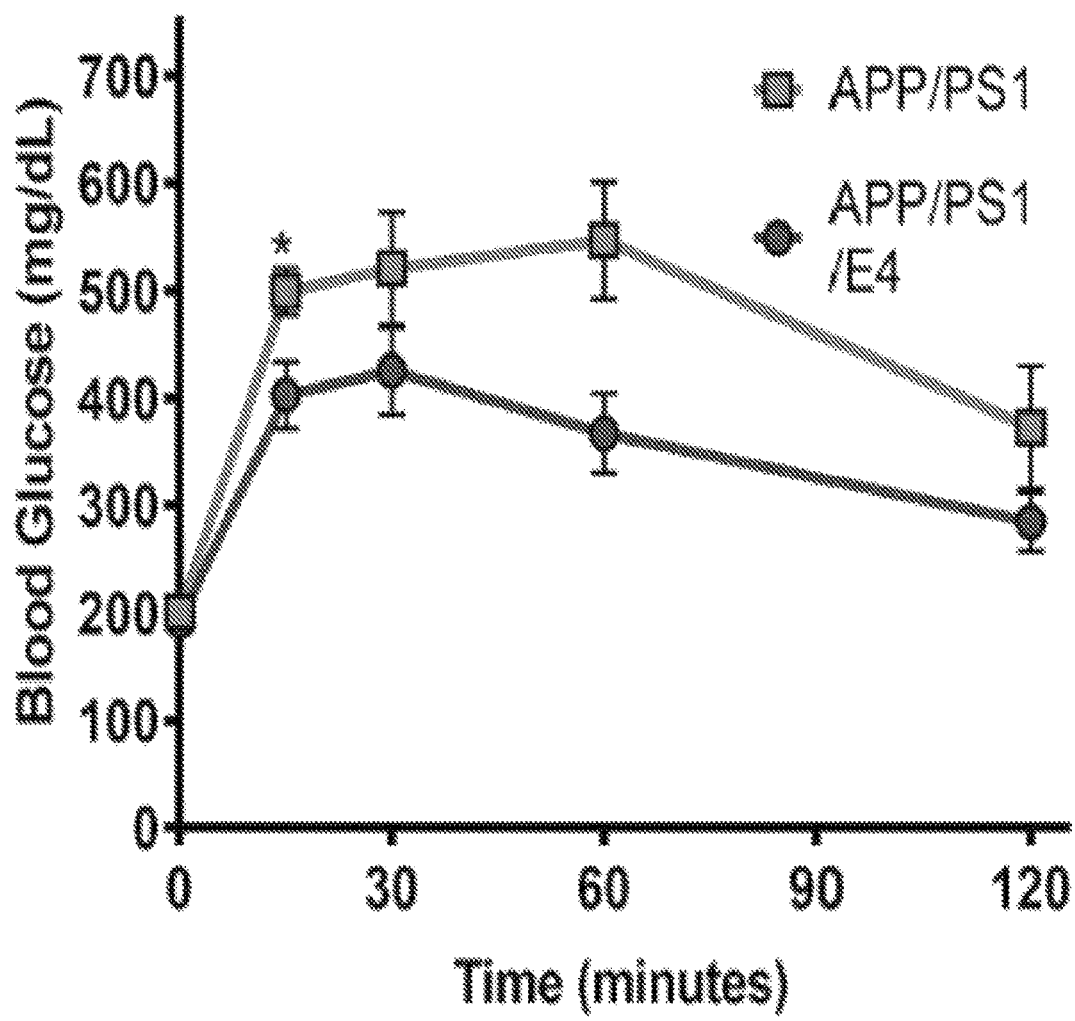
FIGS. 3A and 3B show E4orf1 expression improves glycemic control in APP/PS1 mice (FIG. 3A) with lower AUC (FIG. 3B).
Figure 3B:
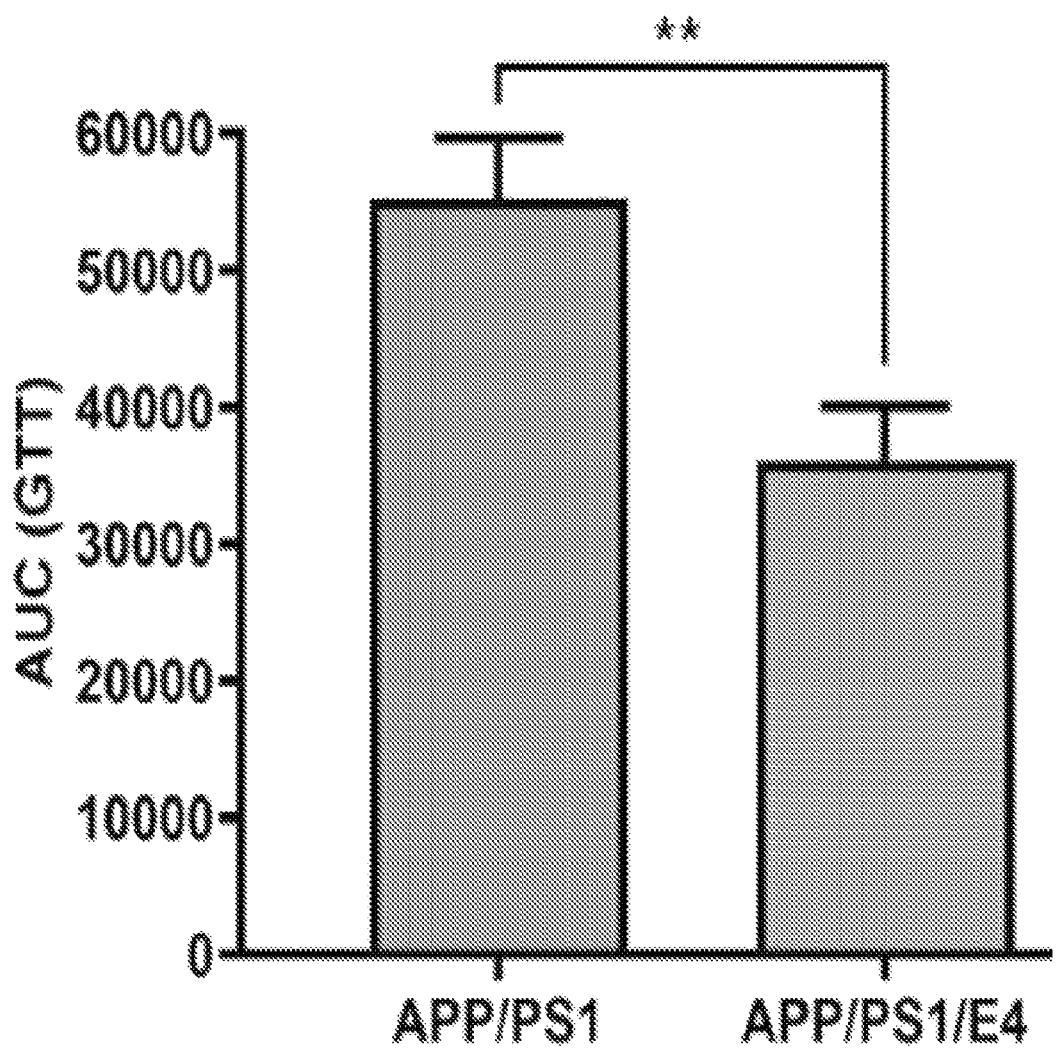

The glucose clearance measured via the glucose tolerance test (GTT). As seen in FIG. 3, APP/PS1 mice expressing E4orf1 were able to clear blood glucose significantly faster (p=0.0086; AUC) (FIGS. 3A-B), compared with control APP/PS1 mice. This validates Applicant's previous observation (FIG. 2) in 2-month old mice, that Ad36E4orf1 modulates peripheral glycemic control.

Figure 4:
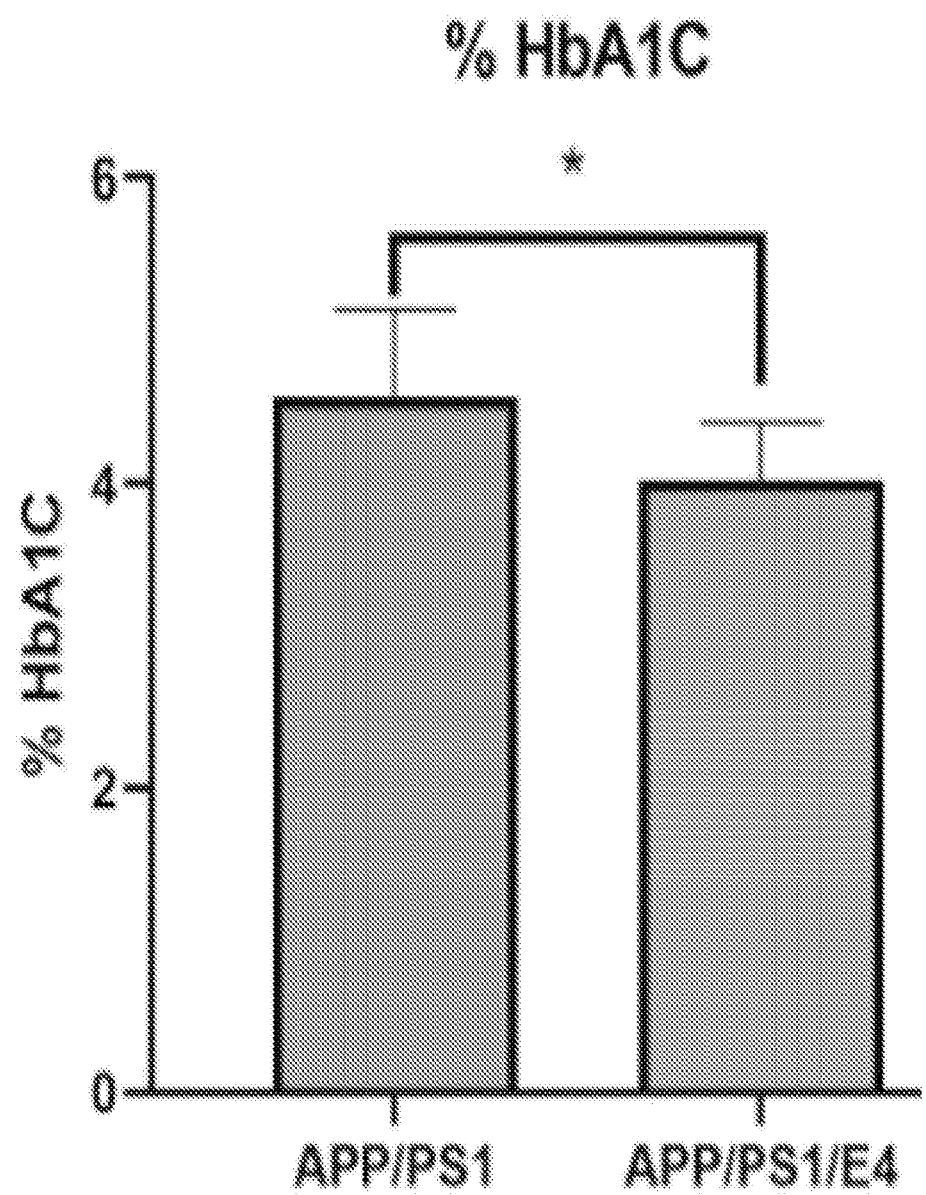
FIG. 4 shows that E4orf1 expression in APP/PS1 mice improves average levels of blood glucose over time as determined by HbA1c.

Another test to determine improvement in glycemic control is to measure the hemoglobin A1c (HbA1c), which tells the average level of blood glucose over the past 2-3 months. APP/PS1/E4orf1 mice show significantly lower HbA1c values (p=0.047) (FIG. 4) compared with control APP/PS1 mice. Collectively, these data show that Ad36E4orf1 expression in older mice prone to AD improves peripheral glycemic control.

Applicant next tested cognition in these mice. To determine spatial learning and memory in these mice, Applicant performed the Morris water maze (MWM) test. MWM has a hidden platform below an opaque water surface with different visual cues placed inside a pool. Four trials with each lasting 60 seconds per day were performed for two consecutive days (Trial 1 and 2), then a gap of 7 days, and followed by two additional days (Trial 3 and 4). The starting position was different at each trial, and the mice were placed onto the platform in case they fail to find it within the given time.

Figure 5:
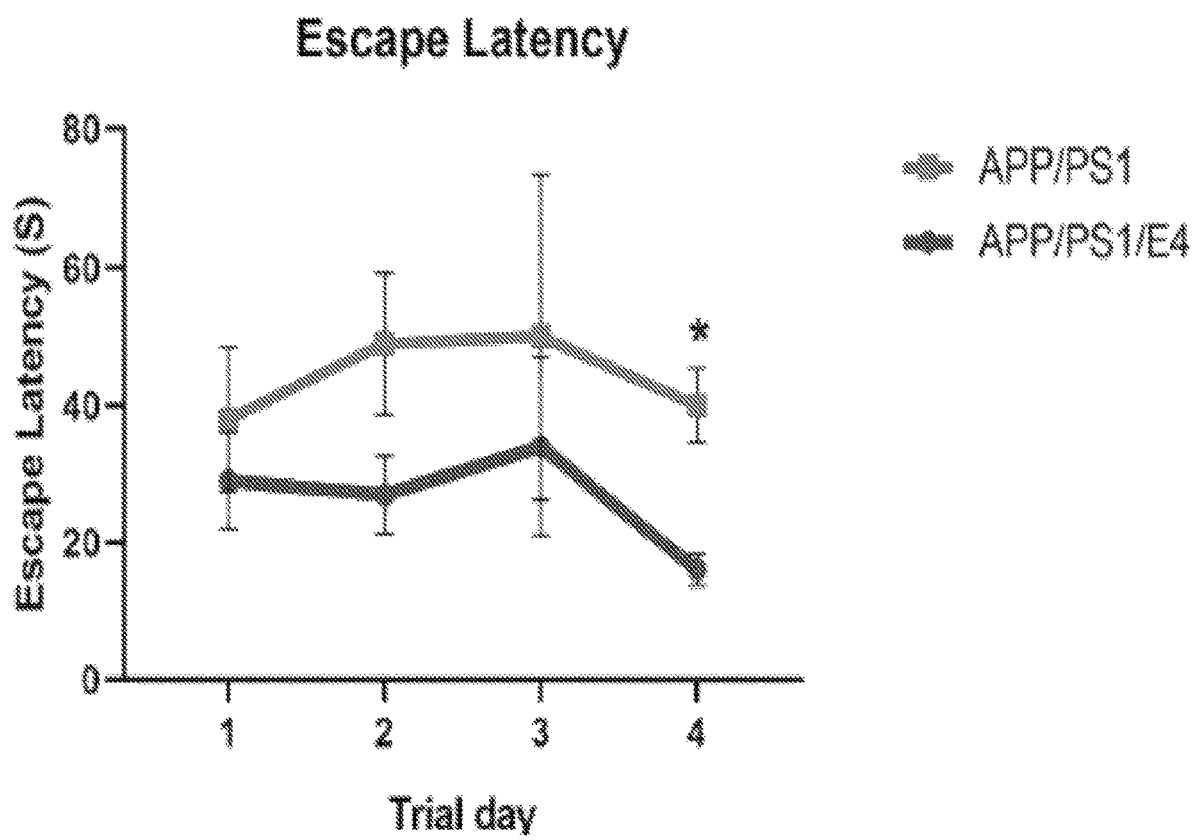
FIG. 5 shows that E4orf1 expression in APP/PS1 mice prevents cognition decline by improving spatial learning and memory.

As seen in FIG. 5, the APP/PS1/E4orf1 mice were able to find the hidden platform faster compared with control APP/P51 mice, which is significantly improved (p=0.03) on trial day 4 (FIG. 5). These observations suggest that Ad36E4orf1 expression in aged AD mice, prevents cognition decline.

Additional experimental results and data are provided in priority provisional patent application No 62/884,150 and incorporated herein by reference.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of treating or preventing Alzheimer's disease or symptoms of Alzheimer's disease in a subject, said method comprising:
    administering to the subject an active agent selected from the group consisting of an adenovirus-36 E4orf1 protein, a nucleic acid encoding an adenovirus-36 E4orf1 protein, or combinations thereof,
    wherein the subject has Alzheimer's disease or exhibits symptoms of Alzheimer's disease, and
    wherein the method treats Alzheimer's disease or symptoms of Alzheimer's disease by improving or maintaining the subject's cognition.

2. The method of claim 1, wherein the active agent comprises an adenovirus-36 E4orf1 protein.

3. The method of claim 2, wherein the adenovirus-36 E4orf1 protein comprises SEQ ID NO: 2, SEQ ID NO:4, or a functional variant thereof, wherein the functional variant has at least 85% sequence identity to SEQ ID NO:2 or SEQ ID NO:4.

4. The method of claim 2, wherein the adenovirus-36 E4orf1 protein comprises SEQ ID NO: 2.

5. The method of claim 2, wherein the adenovirus-36 E4orf1 protein comprises SEQ ID NO: 4.

6. The method of claim 1, wherein the active agent comprises a nucleic acid encoding Adenovirus-36 E4orf1.

7. The method of claim 6, wherein the nucleic acid comprises SEQ ID NO:1, SEQ ID NO: 3, or a functional variant thereof, wherein the functional variant has at least 85% sequence identity to SEQ ID NO: 1 or SEQ ID NO:3.

8. The method of claim 6, wherein the nucleic acid comprises SEQ ID NO:1.

9. The method of claim 6, wherein the nucleic acid comprises SEQ ID NO:3.

10. The method of claim 1, wherein the administering comprises subcutaneous administration.

11. The method of claim 1, wherein the method treats Alzheimer's disease or symptoms of Alzheimer's disease by preserving normal neuronal morphology.

12. The method of claim 1, wherein the subject is a human being.

13. The method of claim 1, wherein the subject has Alzheimer's disease.

14. The method of claim 1, wherein the subject exhibits symptoms of Alzheimer's disease.

15. The method of claim 14, wherein the symptoms of Alzheimer's disease are selected from the group consisting of dementia, impaired cognition, impaired memory, or combinations thereof.

16. The method of claim 1, wherein the active agent is encapsulated in a particle.

* * * * *